United States Patent [19]

Wang et al.

[11] Patent Number: 5,821,725
[45] Date of Patent: Oct. 13, 1998

[54] ELECTRIC CURRENT COMPENSATION CIRCUIT FOR BRUSHLESS MOTORS FOR REDUCING RIPPLES IN OUTPUT TORQUES DURING PHASE CHANGE

[75] Inventors: Chung-Cheng Wang, Jang Hua Hsien; Jin-Chern Chiou; Shih-Tung Cheng, both of Hsinchu, all of Taiwan

[73] Assignee: Industrial Technology Research Institute, Hsinchu, Taiwan

[21] Appl. No.: 731,461

[22] Filed: Oct. 16, 1996

[51] Int. Cl.$^6$ ...................................................... H02P 5/28
[52] U.S. Cl. ...................... 318/799; 318/798; 318/799; 318/800; 318/801; 318/802; 318/803; 318/804; 318/805; 318/806; 318/807; 318/808; 318/809; 318/810; 318/811; 318/812; 318/813; 318/814; 318/815; 318/568.22; 318/432; 318/433; 318/434
[58] Field of Search ..................................... 318/798–815, 318/568.22, 432–434

[56] References Cited

U.S. PATENT DOCUMENTS

| | | |
|---|---|---|
| 5,043,643 | 8/1991 | Hedlund et al. ........................ 318/254 |
| 5,283,726 | 2/1994 | Wilkerson ............................... 318/254 |
| 5,294,876 | 3/1994 | Jonsson ............................... 318/798 X |
| 5,451,846 | 9/1995 | Peterson et al. ........................ 318/254 |

*Primary Examiner*—Karen Masih
*Attorney, Agent, or Firm*—W. Wayne Liauh

[57] ABSTRACT

An electric current compensation circuit for use with a multiple-phase burshless motor to reduce ripples in the output torque is disclosed. It contains a plurality of electric current compensation loops each for a respective phase winding and each of the electric compensation loops contains: (a) a first input for receiving a line current from the driver; (b) a second input for receiving the compensation current from the motor sensor; (c) a forward rectifying circuit for forwardly rectifying the line current and the compensation current; (d) a reverse rectifying circuit for reversely rectifying the line current and the compensation current; and (e) a summation circuit for summing the forwardly rectified compensation current and the reversely rectified compensation current and outputting a synthetic current to a phase winding of the motor. Each time the phase is changed, the electric current compensation circuit is triggered causing the synthetic current to be sent to the motor to allow the motor to generate an output torque with reduced ripple.

3 Claims, 7 Drawing Sheets

ELECTRIC CURRENT COMPENSATION CIRCUIT FOR BRUSHLESS MOTORS FOR REDUCING RIPPLES IN OUTPUT TORQUES DURING PHASE CHANGE

BACKGROUND OF THE INVENTION

1. Field of the Invention

This invention relates to brushless motors, and more particularly, to an electric current compensation circuit for a brushless motor.

2. Description of Related Art

There are two approaches to minimize the ripple in the output torque of DC brushless motors. One approach is to make improvements on the mechanical structure of the DC brushless motors, including new designs for flux path and design choice of the number of poles for the rotor and number of windings for the stator so as to achieve the optimal output torque, The other approach is to make improvements on the drive circuit for the DC brushless motors, including modifications on the method of phase change, or selection of square or sinusoidal wave, two phase or three phase, and full wave or half wave for the driving of the motor.

In consideration of small-size DC brushless motors, however, none of the foregoing two approaches are suitable for minimizing the ripple in the output torque. Presently, these small-sized DC brushless motors are driven by an integrated circuit (IC) driver. There exists, therefore, a need for an electric current compensation circuit which can be integrated also in the IC driver and which can minimize the ripple in the output torque.

SUMMARY OF THE INVENTION

It is therefore a primary objective of the present invention to provide an electric current compensation circuit in an IC driver for brushless motors which can minimize the ripple effect in the output torque of the motor.

It is another objective of the present invention to provide an electric current compensation circuit in an IC driver for brushless motors which can be integrated in the IC driver easily.

In accordance with the foregoing and other objectives of the present invention, a new and improved electric current compensation circuit is provided. The electric current compensation circuit is to be used on a brushless motor of the type including a DC power source for supplying power to the motor, a driver for driving the motor and a sensor for detecting the position of magnetic flux in the motor and thereby generating a feedback signal. The electric current compensation circuit includes an electric current compensation loop for each phase. Each electric current compensation loop receives feedback signals from the sensor and a line current of predetermined waveform to generate a synthetic current each time the phase is changed. The synthetic current is then sent to the motor to allow the motor to generate an output torque with reduced ripple. The electric current compensation loop further includes a reverse rectifying circuit for reversely rectifying the line current and the compensation current, a forward rectifying circuit for forwardly rectifying the line current and the compensation current, and a summation circuit for summing up the output of the reverse rectifying circuit and the output of the forward rectifying circuit, the output of the summation circuit is then sent to a corresponding phase winding in the motor.

BRIEF DESCRIPTION OF DRAWINGS

The invention can be more fully understood from the following detailed description of the preferred embodiments, with reference made to the accompanying drawings, wherein.

DETAILED DESCRIPTION OF PREFERRED EMBODIMENT

The electric current compensation circuit of the present invention in particular is capable of minimizing the ripple in the output torque of a DC brushless motor without having to make modifications to the original structure of the DC brushless motor and its driver. In the following preferred embodiment of the invention, the electric current compensation circuit is used on a 3-phase, 8-pole, and 9-slot DC brushless motor, which means that the motor is driven by a 3-phase circuit and has a rotor with 8 poles and a winding wound on a steel piece having 9 slots. The magnetic flux B produced due to the motor reverse electric potential $e_p$ and the stator winding, and the diameter D of the rotor slot, the angular velocity $\omega$ of the rotor are related to the length of effective stack L. If the number of turns of the stator winding, the diameter of the stator slot, and the angular velocity are known, then the reverse electric potential is $$e_p = B \cdot \omega \cdot D \cdot L$$

$$T\omega = \sum_{p=1}^{3} \cdot e_p \cdot i_p$$

where T is the output torque.

Accordingly, if the reverse electric potential $e_p$ is known, the only factor that will directly affect the output torque T is the input current $i_p$. Through the use of a simulation software program which takes a variety of waveforms of the input current into consideration, the optimal ripple suppressing circuit can be obtained.

Figure 1:
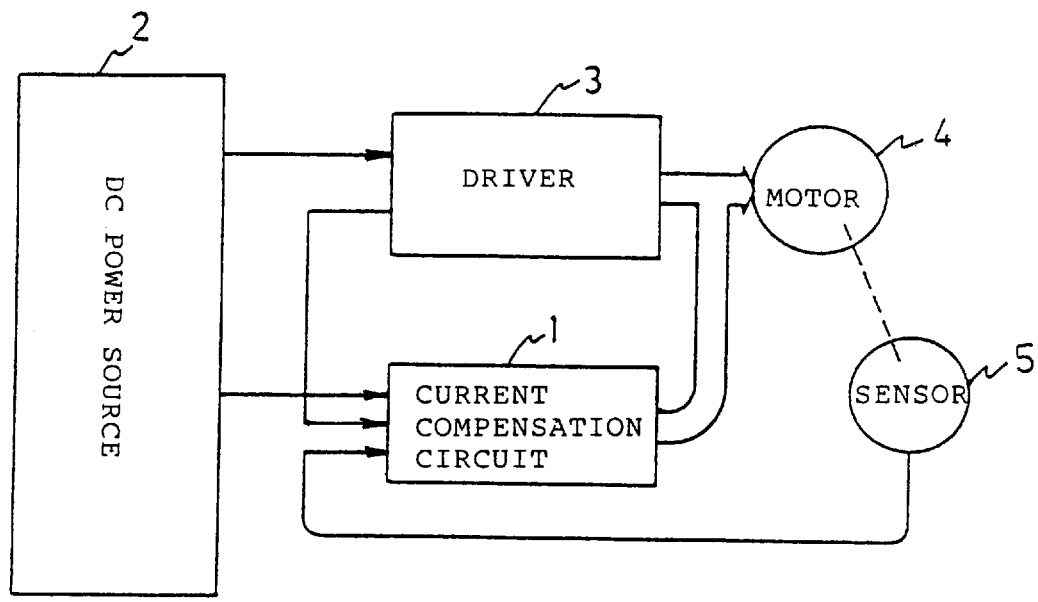
FIG. 1 is a block diagram of the electric current compensation circuit according to the present invention which is used on the drive system for a DC brushless motor.

FIG. 1 is a block diagram of the electric current compensation circuit according to the present invention which is used on the drive system for a DC brushless motor, in which the reference numeral 1 designates the electric current compensation circuit of the invention, 2 designates a DC power source, 3 designates a driver, 4 designates a motor, and 5 designates a Hall sensor. The original drive system is a 3-phase square-wave system. In order to improve the output torque of the motor, the electric current compensation circuit of the invention generates a compensation current in synchronism with the driver 3 based on a feedback signal which is output from the Hall sensor 5. This compensation current is added to the circuit at the time when the driver 3 undergoes a phase change in the input current. This can reduce the ripple in the output torque.

Figure 2:
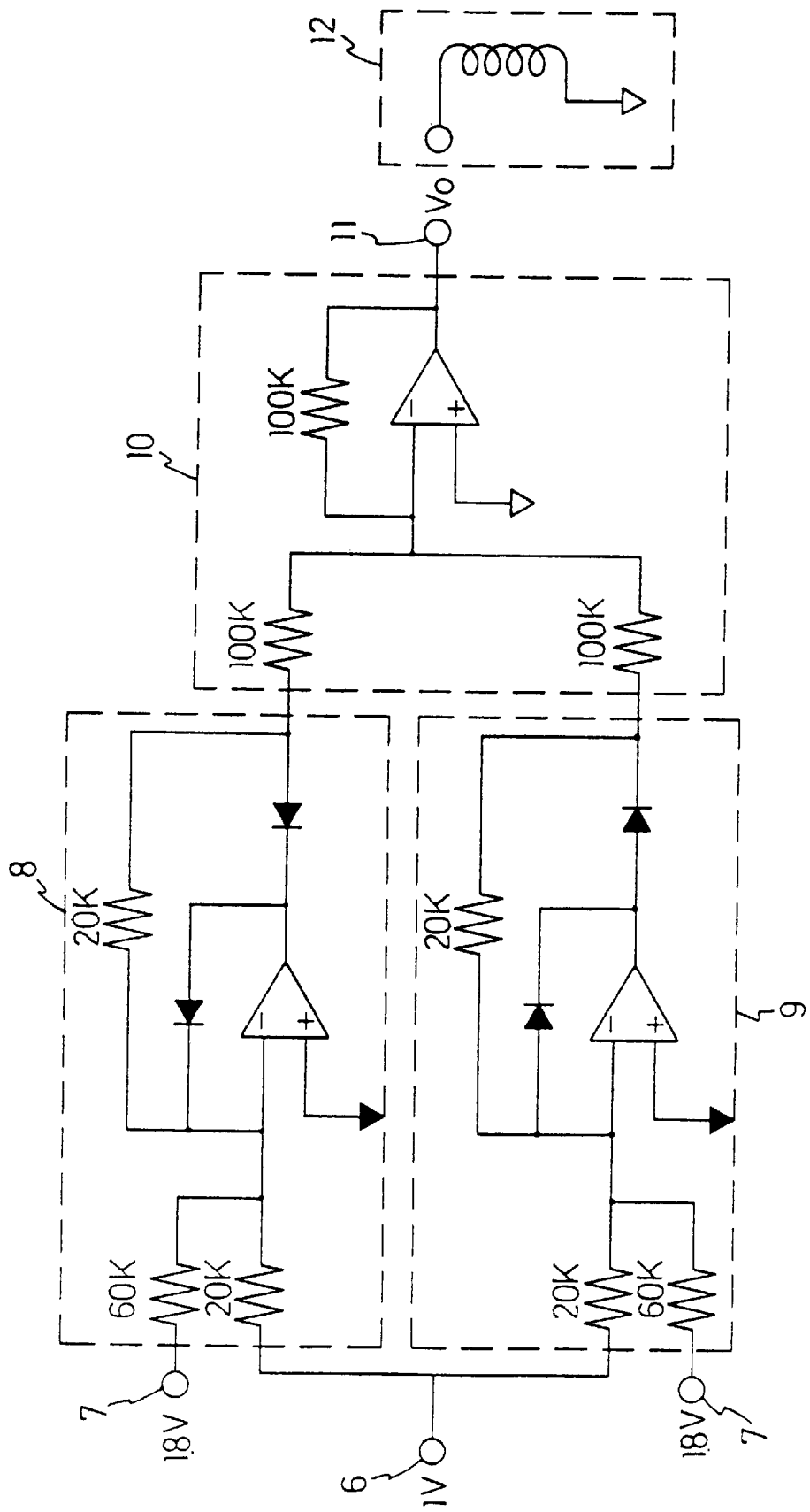
FIG. 2 is a circuit diagram of the electric current compensation circuit according to the present invention.
Figure 3A:
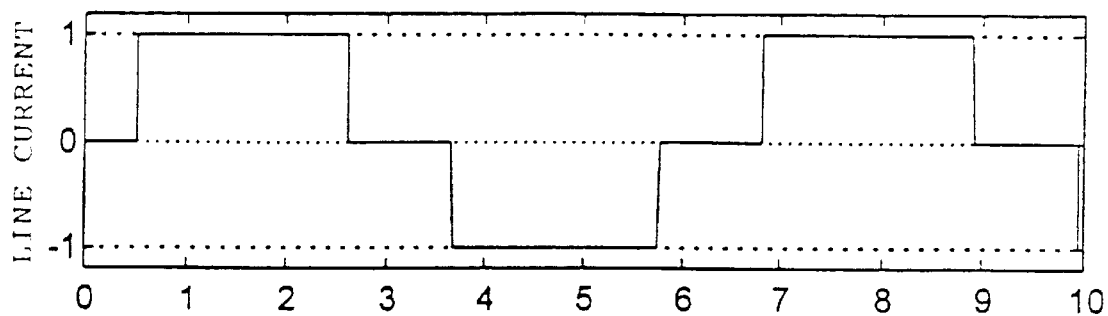
FIGS. 3A through 3C are waveform diagrams of line current, compensated current, and synthetic current.
Figure 3B:
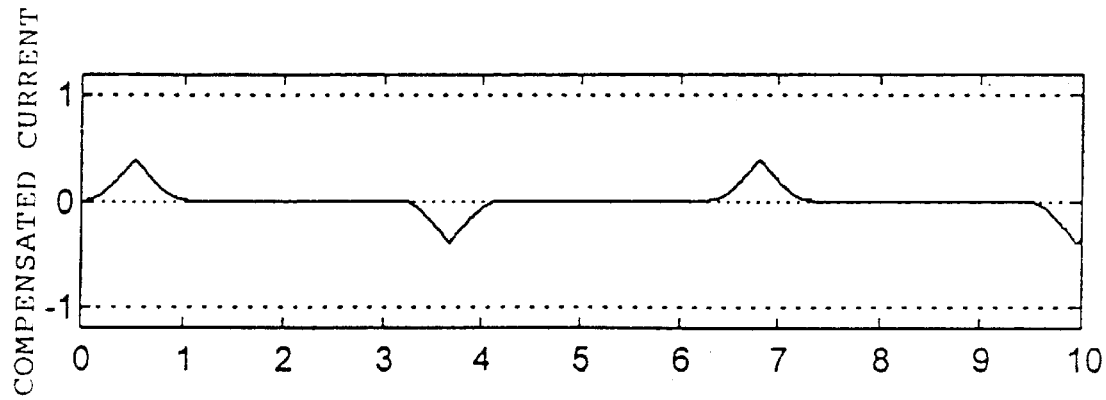
Figure 3C:
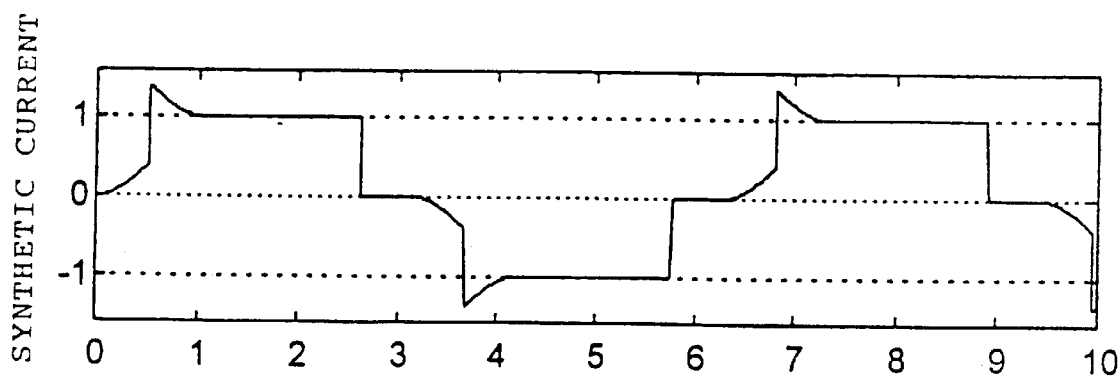

FIG. 2 is a circuit diagram of the electric current compensation circuit according to the present invention when used for one phase current compensation, and FIGS. 3A through 3C are waveform diagrams of the line current, the compensated current, and the synthetic current, respectively in the circuit. The line current of FIG. 3A is output from a current compensation controller and sent to the two input ports 7 shown in FIG. 2, and the compensated current of FIG. 3B is output from a driver IC and sent to the input ports 6. The circuit includes a reverse rectifying circuit 8, a forward rectifying circuit 9, and a summation circuit 10. Through this circuit, a synthetic current with a waveform shown in FIG. 3C is sent out from the output port 11. This synthetic current is then applied to one of the phase windings 12 of the motor. The other two phases are compensated in a similar way.

Figure 4A:
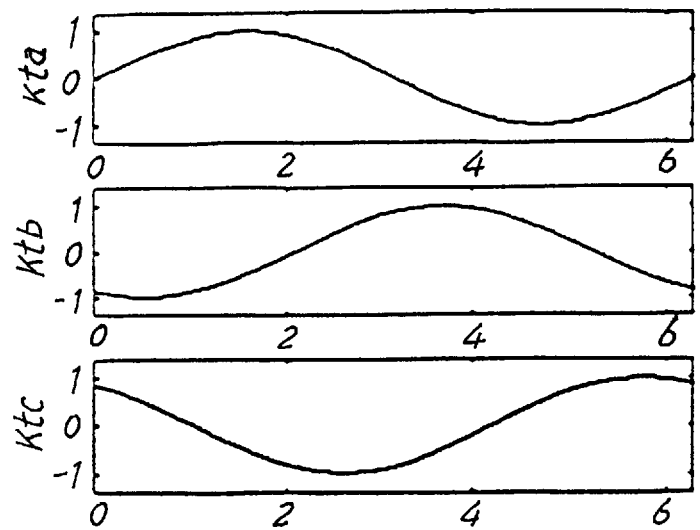
FIGS. 4A through 4D are characteristic plots of some parameters in a prior art electric current compensation circuit.
Figure 4B:
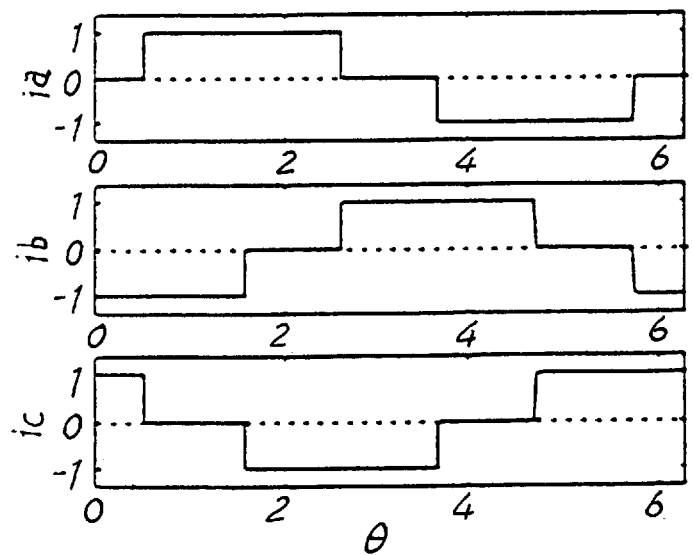
Figure 4C:
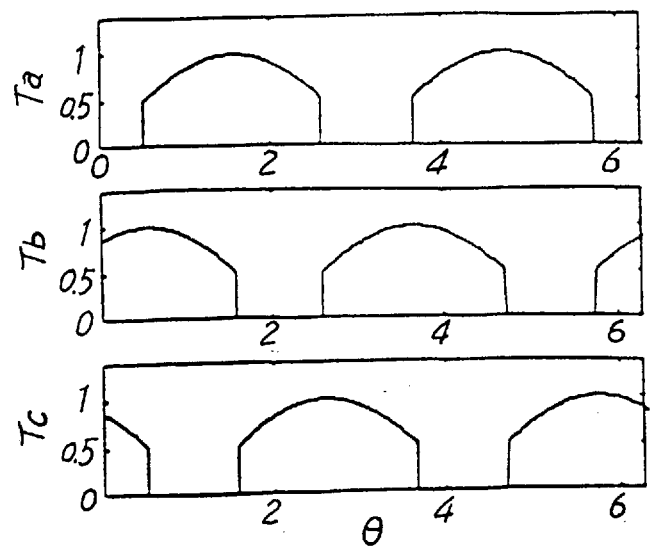
Figure 4D:
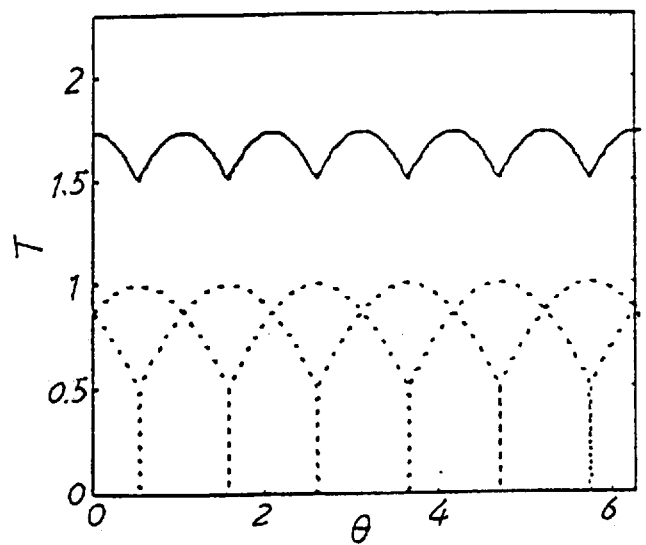

FIGS. 4A through 4D are characteristic plots of several related parameters in a prior art electric current compensation circuit. FIG. 4A shows the characteristic plots of the torque parameters kta, ktb, ktc of the three phases versus angular displacement θ, FIG. 4B shows the characteristic plots of the input current $i_a$, $i_b$, $i_c$ of the three phases versus angular displacement θ, FIG. 4C shows the characteristic plots of the output torque Ta, Tb, Tc of the three phases versus angular displacement θ, and FIG. 4D shows the characteristic plots of the total output torque. As shown in FIG. 4D, the peak value of the output torque is about 1.75, and the magnitude difference from the highest peak to the lowest one is about 0.25. The ripple is about 10.8% of the total output torque.

Figure 5A:
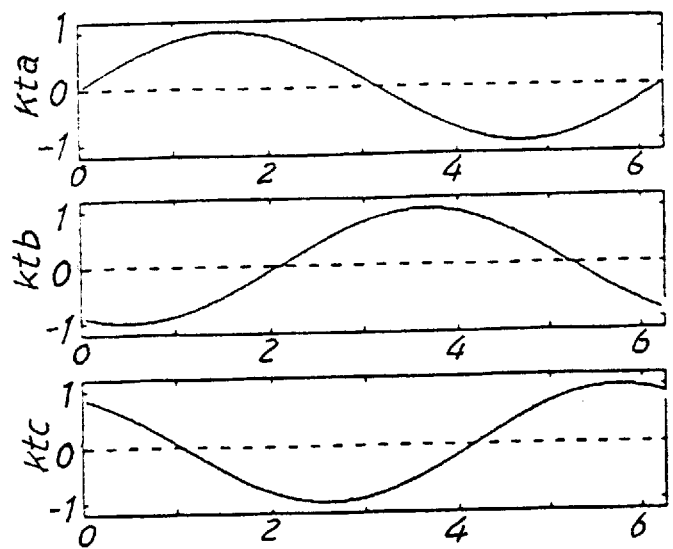
FIGS. 5A through 5D are characteristic plots of some parameters in the electric current compensation circuit according to the present invention.
Figure 5B:
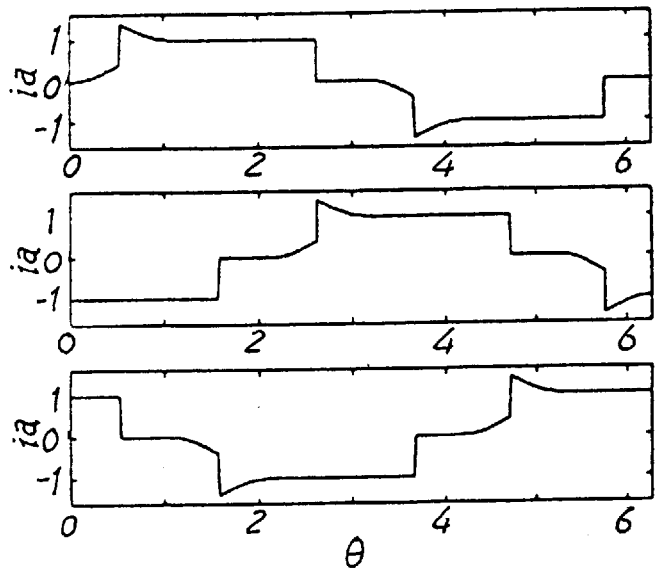
Figure 5C:
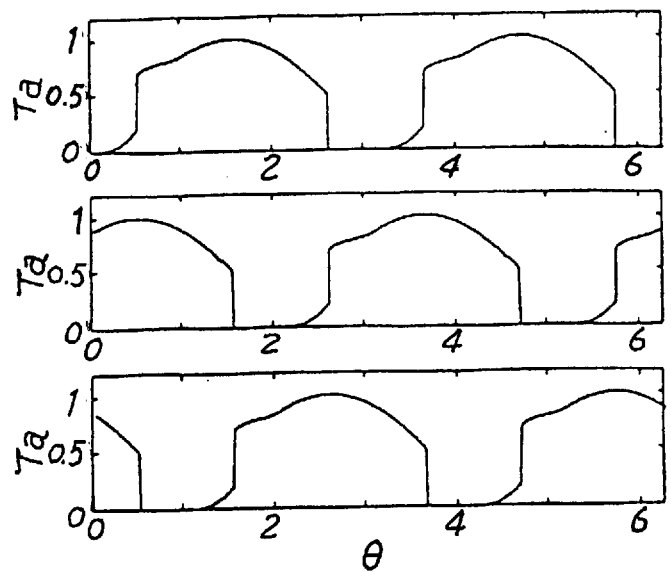
Figure 5D:
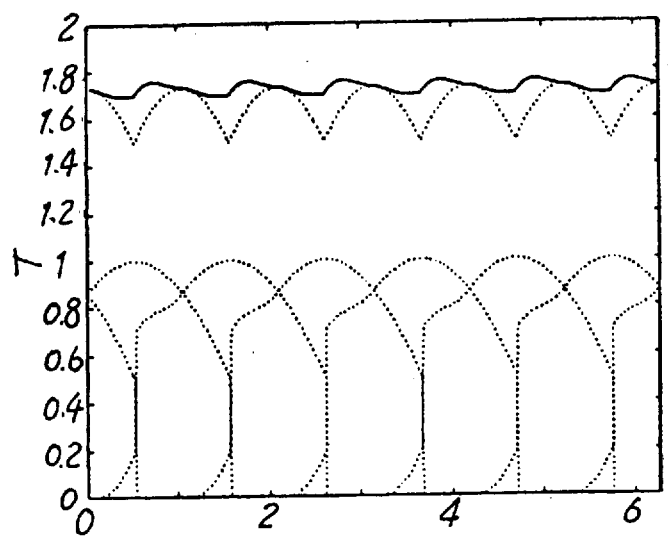

With the appendage of the electric current compensation circuit according to the present invention to the motor drive system, the same parameters are improved as shown in FIGS. 5A through 5D. FIG. 5A shows the characteristic plots of the torque parameters kta, ktb, ktc of the three phases versus angular displacement θ, FIG. 5B shows the characteristic plots of the input current $i_a$, $i_b$, $i_c$ of the three phases versus angular displacement θ, FIG. 5C shows the characteristic plots of the output torque Ta, Tb, Tc of the three phases versus angular displacement θ, and FIG. 5D shows the characteristic plots of the total output torque. As clearly shown in FIG. 5D, the output torque is substantial smoothed compared to that shown in FIG. 4D. The ripple here is only about 2.7% of the total output torque, which represents a significant improvement over the prior art.

From the results shown in the foregoing, it is apparent that the electric current compensation circuit of the invention is capable of reducing the ripple in the output torque of the motor. This allows the operation of the motor to be more smooth and reliable. Further, the electric current compensation circuit is suitable for integration in the IC driver so that no extra room on the circuit board is necessary.

The invention has been described using exemplary preferred embodiments. However, it is to be understood that the scope of the invention is not limited to the disclosed embodiments. To the contrary, it is intended to cover various modifications and similar arrangements. The scope of the claims, therefore, should be accorded the broadest interpretation so as to encompass all such modifications and similar arrangements.

What is claimed is:

1. An electric current compensation circuit for a multiple-phase burshless motor wherein said motor includes a DC power source for supplying power to the motor, a driver for driving the motor, a sensor for detecting a position of magnetic flux in the motor and thereby generating a feedback signal in the form of a compensation current;

further wherein said electric current compensation circuit comprises a plurality of electric current compensation loops each for a respective phase and each of said electric compensation loops comprises:
a first input for receiving a line current from said driver;
a second input for receiving said compensation current;
a forward rectifying circuit for forwardly rectifying said line current and said compensation current and outputting a forwardly rectified compensation current;
a reverse rectifying circuit for reversely rectifying said line current and said compensation current and outputting a reversely rectified compensation current; and
a summation circuit for summing said forwardly rectified compensation current from said forward rectifying circuit and said reversely rectified compensation current from said reverse rectifying circuit and outputting a synthetic current to a phase winding of said motor; whereby each time the phase is changed, said electric current compensation circuit is triggered so as cause said synthetic current to be sent to the motor to allow the motor to generate an output torque with reduced ripple.

2. The electric current compensation circuit of claim 1, wherein the brushless motor is a three-phase brushless motor.

3. The electric current compensation circuit of claim 1, wherein the driver is an IC driver.

* * * * *